Figure 1:
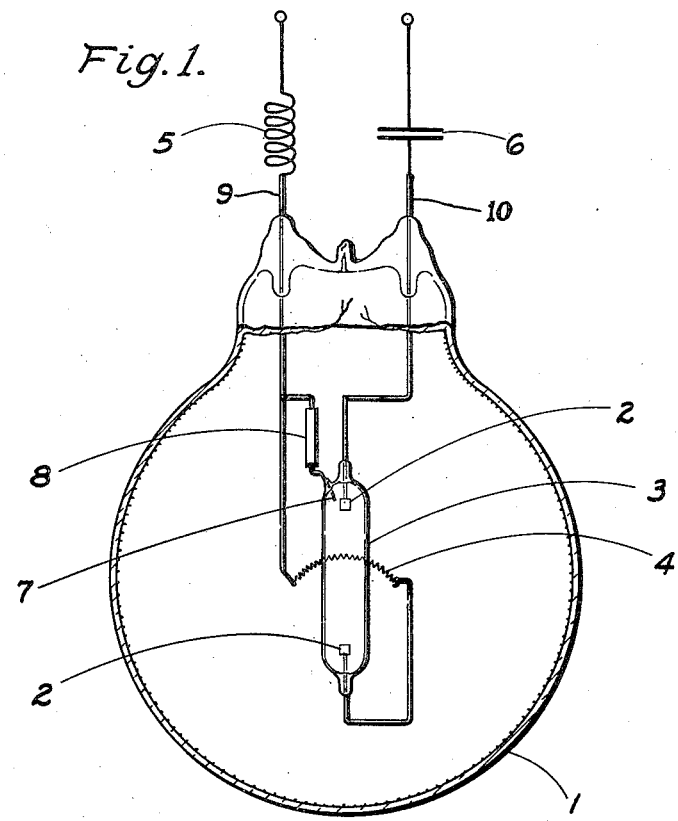

June 24, 1941.  H. KREFFT ET AL  2,247,198
ELECTRIC MIXED LIGHT LAMP WITH MERCURY PRESSURE DISCHARGE
FOR ALTERNATING CURRENT CIRCUITS
Filed Feb. 2, 1939

INVENTORS:
Hermann Krefft,
Kurt Larché,
Hermann Kummer,

BY Harry E. Dunham

ATTORNEY.

Patented June 24, 1941

2,247,198

UNITED STATES PATENT OFFICE 2,247,198

ELECTRIC MIXED LIGHT LAMP WITH MERCURY PRESSURE DISCHARGE FOR ALTERNATING CURRENT CIRCUITS

Hermann Krefft, Berlin - Schoneberg, Kurt Larché, Berlin - Tempelhof, and Hermann Kummer, Neuenhagen-Sud, near Berlin, Germany, assignors to General Electric Company, a corporation of New York Application February 2, 1939, Serial No. 254,146
In Germany February 4, 1938

15 Claims. (Cl. 176—1)

The introduction of the known mercury pressure discharge lamps which burn extremely economically for general illumination and especially for interior illumination, has been hitherto rendered difficult chiefly on account of the over-emphasized green color characteristics of the light emitted by an arc in mercury vapor. Consequently, the recent development of these lamps is directed primarily to obtaining light of better color distribution, especially to obtaining a sufficient red content in the light. With this object in view it has been proposed to admix substances, chiefly cadmium and zinc with the mercury vapor filling, which substances are also energized by the discharge and supply the lacking color rays. However, it has been found that these admixture substances, when they are approximately sufficient for improving the color, considerably reduce the light yield of the discharge in a disadvantageous manner and where high vapor pressures are used, for example 10 atmospheres and more, they mostly attack strongly the quartz discharge vessel.

Numerous endeavours to improve the beam of a mercury pressure lamp by utilizing luminous substances have also not led to the results anticipated. Although all kinds of luminous substances and luminous substance mixtures which are available to-day have been combined with a high pressure lamp, it has up to the present not been possible to considerably exceed a red content corresponding to about one third of the red content of daylight.

It has been found, that in the present state of the art of discharge lamps, a red content satisfying all requirements can only be obtained by admixing the light of an incandescent filament with the light of a high pressure arc. This is effected in a particularly advantageous manner in the known mercury pressure lamps, in which in the envelope vessel of the discharge lamp an incandescent wire spiral is accommodated which serves as series resistance for the arc. These known mixed light lamps emit light of sufficient red content, but are open to the objection that their light yield is much less than that of pressure discharge lamps without series connected incandescent body. A current limiting ohmic resistance, for example an incandescent spiral necessitates fixing of the burning voltage of the discharge lamp relatively low as compared with the mains voltage. Otherwise there is a danger of the discharge lamp burning unsteadily and, in the event of fluctuations in the mains voltage, it easily goes out or does not relight after passing through the zero point of the alternating current.

Figure 2:
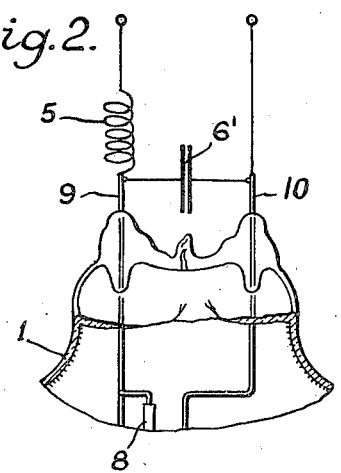
Figure 3:
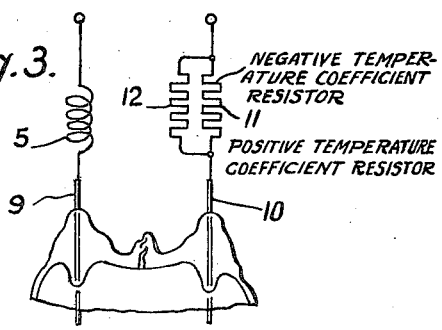

The object of the invention is to produce a mercury pressure lamp with high red content and high yield of light and also to increase the light yield of a mercury pressure lamp with incandescent series resistance both being mounted in an envelope. In the accompanying drawing Fig. 1 shows diagrammatically a mixed light lamp for alternating current circuits and Figs. 2 and 3 illustrate modifications.

The invention is based on the known phenomenon that a discharge lamp with which a choke coil or a condenser or a combination of both is connected in series to limit the current, also burns reliably with a relatively high burning voltage. The reason for this is that, when employing differently phased series resistances, a considerable voltage value occurs on the discharge tube as the discharge current passes through the zero point, said voltage value immediately leading to its reignition and furthering the rapid increase of the current in the opposite direction. The oscillograms of pressure discharge lamps actuated by alternating current clearly show that, when using a series impedance, the current curve passes through the zero line practically without interruption whereas, when using an ohmic series resistance, the lamp, at the reversal of the direction of current, remains currentless during a considerable portion of the semi-period of the alternating current. For this reason strongly marked flicker occurs when using ohmic series resistances.

By utilizing this effect of a phase displacing series impedance enabling an increase of the burning voltage of the discharge lamp, two current limiting series-connected elements hitherto always used only separate from each other are, according to the invention, series-connected to a pressure discharge lamp, one being an ohmic resistance constructed as incandescent body and the other a phase displacing impedance. In a mixed light lamp of this type the series-connected incandescent wire has for its object to supplement the arc beam by adding the lacking rays, especially the red rays to form a satisfactory mixed light, whereas the phase displacing impedance has for its object to render it possible to use a high burning voltage of the discharge tube in many instances only slightly lower than the mains voltage.

Tests have shown that, in comparison with a discharge tube having only one series-connected incandescent body, the additional series-connection of a phase displacing device certainly results in some instances in a slight shortening of the illuminating body and consequently in a slight reduction in its light output, but that the increase of the burning voltage of the discharge tube rendered possible by the phase displaced course of the current and voltage curve results in a very considerable increase in the light ouput of the discharge tube. The gain in light on the discharge tube is considerably greater than the loss of light on the incandescent body, that is the total lighting current of the lamp and consequently its light yield increases. It has also been found that the shortened incandescent body can supply sufficient supplementary rays to obtain a red ray content which approximately corresponds to that of daylight especially when the envelope vessel of the pressure lamp also contains luminescent substances supplying red rays.

To obtain a considerable increase of operating voltage for the discharge tube, it is advisable to select the electric impedance of the phase displacing device so that it is greater than the electric resistance of the series-incandescent body.

It has been found particularly advantageous to use a choke coil in combination with a small condenser whose impedance value is many times the impedance of the choke coil and which bridges the discharge tube and preferably also the series incandescent body. The favorable effect of a condenser parallel to a discharge tube with series choke coil is known. However, the inclusion of a series incandescent body in the bridging line is novel. This measure results in the great advantage that the series incandescent body attenuates the condenser discharges. Such an arrangement is shown in Fig. 2, the lamp parts here broken away being the same as shown in Fig. 1. The condenser 6' bridges the mercury tube and the filament as it is connected across the conductors 9, 10 as shown.

If as phase displacing impedance a choke coil and also a condenser are series-connected to the discharge tube and to the incandescent wire, another feature of the invention can be unexpectedly attained by suitable tuning or proportioning of the three series impedances, which tuning can easily be determined by trials, namely that the lamp current remains to a great extent independent of fluctuations in the mains voltage and in the burning voltage of the discharge tube. The resistance values can even be set without difficulty so that the initial current occurring after the switching on of the mercury pressure discharge tube does not drop considerably during the burning-in process, as in the lamps hitherto known, in spite of the increase in the burning voltage of the high pressure tube, but remains to a great extent unchanged or even increases. The fact that the lamp current does not drop is of great value in view of the series incandescent body as this is no longer overstressed under service conditions, that is, it has the most favorable burning temperature in service.

In the event that for example only a choke coil or only a condenser is used as series impedance, as shown in Fig. 3, the lamp current can evidently be maintained constant by a starting device, for example, (a) by a resistance 11 united with the lamp and having a strong negative temperature coefficient which either itself lies in the lamp circuit and is heated by the current heat or, (b) which lies parallel to an auxiliary starter resistance 12 and short circuits this more and more during the burning-in process. In example (a) the resistance 12 is omitted.

It may be advisable in some instances to arrange in the interior of the envelope vessel enclosing the discharge tube, one or several spare incandescent bodies which, when one of the incandescent bodies burns out, are switched in, for example by hand when the current leads to the spare incandescent wires and connected to separate holder contacts, or automatically in using change-over switching devices such as are known in multiple filament incandescent lamps. As in a mixed light lamp constructed according to the invention, the series incandescent wire is relatively short, one or several incandescent wires may be fitted without difficulty as spare wires in the envelope vessel.

A mixed light lamp for alternating current is illustrated diagrammatically by way of example in the accompanying drawing.

Referring to Fig. 1, the envelope vessel 1 encloses the mercury pressure tube 3 provided with incandescent electrodes 2. The discharge tube 3 is made of a glass permitting the passage of ultra-violet rays, especially of quartz glass, and contains a gas filling and a portioned quantity of merucry (not shown). The envelope vessel 1 accommodates the relatively short luminous filament or spiral 4 which seres as current limiting series resistance for the pressure tube 3 and mixes chiefly red rays with the beam of the mercury high pressure arc. In series with the conductors 9, 10 of the discharge tube are not only located the illuminating wire spiral 4 but also a choke coil 5 and a condenser 6 which are arranged separate from the lamp and whose impedances are so dimensioned that the lamp current is to a great extent independent of the fluctuation in voltage of the mains and of the changes in the burning voltage of the discharge tube 3. The usual auxiliary ignition electrode is designated by 7 and its high ohmic series resistance by 8.

The lamp is intended for connecting up to 220 volt alternating current mains. Its power input should amount to, for example, 120 watts. In utilizing the favourable effects of the series impedance the lamp is so dimensioned that in service the high pressure tube attaining a vapor pressure of about 10 atmospheres takes up 120 volts and 73 watts and the illuminating body 55 volts and 37 watts, whereas the consumption of the series impedance consisting of the choke coil 5 and the condenser 6 amounts to only 10 watts.

In such mixed light lamp constructed according to the practical conditions the yield of light of the discharge tube is about 44 Hlm. per watt and the series incandescent body about 15 Hlm. per watt. Consequently, the light output of the lamp is 44×73+15×37 that is $$3220+550=3770 \text{ Hlm.}$$

The light yield of the mixed light lamp therefore amounts to 3770:120=31.4 Hlm. per watt. The abbreviation herein of Hlm. designates Hefner lumens.

Such a mixed light lamp will now be compared with a known lamp in which only an incandescent wire spiral is series-connected to the high pressure tube. If the same demands are made on the two lamps as regards the reliable burning of the incandescent wire and especially as regards the satisfactory operation of the high pressure tube, the burning voltage of the pressure tube should not rise above about 73 volts in the known lamp in which only a series incandescent wire is used. In such a lamp the yield of light of the high pressure tube is only about 30 Hlm. per watt, especially as the electrode drops which must be taken as losses work out proportionally higher. The yield of light of the series incandescent spirals must be taken at about 10 Hlm. per watt because the wire must be somewhat thicker on account of the excess starting-up current. Consequently, the light output of this comparison lamp is $30 \times 40 + 10 \times 80 = 1200 + 800$, that is 2000 Hlm.

Its light yield is only $2000:120=16.7$ Hlm. per watt.

Whereas the light yield of the formerly known lamp only amounts to about 16.7 Hlm. per watt, that of the lamp according to the invention amounts to 31.4 Hlm. per watt, i. e. is almost twice as great.

It has not even been taken into consideration that, when using a luminescent substance applied on the outer envelope or when using an outer envelope made of luminescent glass, this envelope, in the case of the mixed light lamp with the high burning voltage on the mercury discharge produces additional light by ray conversion which is far greater than the primary light absorbed. This gain does not occur in the known mixed light lamp as the ray yield of ultraviolet is considerably less in the case of the mercury burner of lower voltage.

An important point is that, when using a luminescent substance producing a red beam, the above calculated increase of the light yield is attained in the case of the lamp constructed according to the invention, without resulting in an appreciably lower red content as compared with the known lamp with smaller yield of light, as is proved by the following calculation of the red content.

According to the practical conditions the red content of the pressure tube is taken at 1.3%, that of the incandescent wire spiral at 25% and the improvement of the red content by the luminous substance at about 5%. Consequently, in the case of the mixed light lamp operated only with one series incandescent spiral, the red radiation amounts to:

$0.013 \times 1200 + 0.05 \times 1200 + 0.25 \times 800$, that is $15.5 + 60 + 200 = 275$ Hlm. and consequently the red content is $275:2000=13.7\%$; whereas in the case of the mixed light lamp with series incandescent spiral and series impedance the red radiation is $0.013 \times 3220 + 0.05 \times 3220 + 0.25 \times 550$, that is $42 + 161 + 137 = 340$ Hlm., and consequently the red content amounts to $340:3770=9.05\%$. Although the light yield is doubled the red content is still more than 9%. This is only slightly lower than the red content of daylight which is about 12%.

The higher the service vapor pressure is chosen in a pressure lamp according to the invention, the more favorable will be the color and yield of light as it is a known fact that an increase in pressure results in the spectrum becoming more complete and is more similar to that of daylight. For these reasons vapor pressures exceeding 25 atmospheres are preferable.

We claim:

1. An electric mixed light lamp for alternating current circuits, comprising in combination a mercury pressure discharge tube, an envelope vessel provided with luminescent material emissive in the red spectral range, an incandescent body series-connected to said tube, said tube and said body being accommodated in said envelope vessel, and a phase displacing impedance series-connected to said series-connected incandescent body.

2. A mixed light lamp as specified in claim 1, in which the phase displacing impedance consists of a choke coil.

3. A mixed light lamp as specified in claim 1, in which the phase displacing impedance consists of a condenser.

4. A mixed light lamp as specified in claim 1, in which the phase displacing impedance consists of a choke coil and of a condenser.

5. A mixed light lamp as specified in claim 1, in which the electric impedance of the phase displacing element is greater than that of the series-connected incandescent body.

6. In a mixed light lamp as specified in claim 1, the impedance consisting of a series-connected choke coil, a small auxiliary condenser bridging the mercury pressure discharge tube and the series-connected incandescent body, the impedance of said condenser being many times that of the series-connected choke coil.

7. A mixed light lamp as specified in claim 1, in which the phase displacing impedance consists of a choke coil and of a condenser series-connected to the mercury pressure discharge tube and the series incandescent body, the impedances of said choke coil and said condenser being proportioned relative to the resistance of the series incandescent body and to the discharge tube so that the lamp current intensity remains substantially constant in spite of fluctuations in the mains voltage and changes in the burning voltage of the mercury pressure discharge tube.

8. In a mixed light lamp as specified in claim 1, a resistance having a negative temperature coefficient connected in series to the mercury pressure discharge tube and adapted to take up a portion of the mains voltage during the burning-in process.

9. In a mixed light lamp as specified in claim 1, a starting series resistance heated by the current and having a marked negative temperature resistance coefficient connected in series to the mercury pressure discharge tube and adapted to take up a portion of the mains voltage during the burning-in process.

10. A mixed light lamp as specified in claim 1, in which the voltage absorption of the series-connected incandescent body amounts to 30 to 60% of the voltage absorption of the mercury pressure discharge tube.

11. An electric mixed light lamp for alternating current circuits comprising in combination a mercury vapor discharge device, an incandescent filament, a phase-displacing device, conductors connecting said devices electrically in series, and an envelope enclosing both said discharge device and filament.

12. An electric mixed light lamp for alternating current circuits comprising in combination a mercury vapor discharge device, an incandescent filament, a phase-displacing device, conductors connecting said devices electrically in series, the impedance value of said phase-displacing device being materially greater than the resistance value of said filament.

13. An electric mixed light lamp for alternating current circuits comprising in combination a mercury vapor discharge device, an incandescent filament, a condenser, conductors connecting said devices electrically in series, and an envelope enclosing both said discharge device and filament.

14. An electric mixed light lamp for alternating current circuits comprising in combination a mercury vapor discharge device, an incandescent filament, a choke coil, a condenser, conductors connecting said devices electrically in series, and an envelope enclosing both said discharge device and filament.

15. An electric mixed light lamp for alternating current circuits comprising in combination a mercury vapor discharge device, an incandescent filament, a choke coil, a condenser, the impedance value of said condenser being many times greater than the impedance value of said choke coil, conductors connecting said devices electrically in series, and an envelope enclosing both said discharge device and filament.

HERMANN KREFFT.
HERMANN KUMMER.
KURT LARCHÉ.